2,702,818
Patented Feb. 22, 1955

2,702,818

FREE-FLOWING SURFACE ACTIVE AGENT IN DISCRETE-PARTICLE FORM

Louis H. Jaquay, Upper St. Clair Township, Allegheny County, Pa., assignor to American Cyanamid Company, New York, N. Y., a corporation of Maine No Drawing. Application October 14, 1953,
Serial No. 386,100

3 Claims. (Cl. 260—481)

This invention relates to surface-active compositions and, more particularly, to compositions containing surface-active dialkyl sulfosuccinates in which the alkyl groups contain at least five carbon atoms prepared in the form of dry, free-flowing pellets, and to methods of preparing the same.

The diesters of sulfosuccinic acid with alcohols of five or more carbon atoms are well-known in the industry as wetting and emulsifying agents, their preparation being described in U. S. Patent 2,028,091. Of these compounds, the di-(2-ethylhexyl) sulfosuccinate, in the form of its sodium or other alkali metal salt, is the most commonly known and possesses the highest wetting power, as measured by the standard Draves test. The diamyl sodium sulfosuccinate and the dihexyl sodium sulfosuccinate are lower in wetting power, but are somewhat more easily soluble in water than is the di-(2-ethylhexyl) compound, and all three are sold commercially in large quantities. The dinonyl and didecyl sodium sulfosuccinates are at present used principally as emulsifying agents and detergents, although they are also good wetting agents.

Heretofore, these wetting agents have been sold commercially in several forms, such as solutions either in water or in aqueous organic solvents, or in dry admixture with inert organic or inorganic diluents, or in pure 100% form. The solutions are used where the surface-active agent is desired in a quickly water-soluble form, but such a solution requires special containers of glass, stainless steel or aluminum and involves the shipment and storage of substantial quantities of solvent which is undesirable and increases the cost of the product used. The dry powders usually contain merely about 10–20% of the active dialkyl sulfosuccinate in admixture with 80–90% of an inert diluent such as Cerelose or sodium sulfate. These dry mixtures are water-soluble and free-flowing, but also necessitate the shipment and storage of large quantities of diluent material which, as stated above, is undesirable and costly.

These economic disadvantages of the solution or the dry powdered forms have tended to make the substantially pure or so-called 100% form even more popular, in spite of a few minor disadvantages found in such a form. For example, in their pure or 100% form, the dialkyl sulfosuccinates of aliphatic alcohols of five or more carbon atoms are solid waxes which are somewhat plastic and tacky and slightly hygroscopic in nature. As a result of their sticky feel, even though manufactured as discrete particles, they tend to flow together to some extent and to form an adhered lump of pellets which cannot be very easily removed from the containers or packages in which they have been stored or shipped.

Heretofore, the known method of overcoming the inherent stickiness of the dialkyl sulfosuccinates has been to mix them with relatively large quantities of dry organic or inorganic diluents, such as sugars or sodium sulfate. However, as noted above, this method required the use of considerably more diluent than wetting agent, whereby considerable economic disadvantages were introduced. The present invention is based on the discovery of a method of preparing dialkyl sulfosuccinates which will overcome the inherent stickiness of the dialkyl sulfosuccinates and will provide pellets or discrete particles of a free-flowing nature without increasing the bulk thereof to any marked degree.

I have found that if pellets or other commercial forms of the dialkyl sulfosuccinates of aliphatic alcohols of five or more carbon atoms are manufactured and, before the opportunity is presented to flow together to form a tacky solid lump, they are coated with a thin layer of a fine, dry powder of a dialkyl sulfosuccinate of an aliphatic alcohol of less than five carbon atoms, the resulting pellets are in the form of discrete particles which are free-flowing, show no tendency to flow and stick together, and have not had their usefulness or activity influenced to any substantial degree.

The compositions of my invention therefore contain, as essential ingredients, a major portion of a dialkyl ester of sulfosuccinic acid in which the alkyl radicals contain at least five carbon atoms together with a minor portion of a dialkyl ester of sulfosuccinic acid in which the alkyl radicals contain four or less carbon atoms. It is to be appreciated that these alkyl radicals need not necessarily be similar but may be unlike, such as when mixed alcohols are used in their preparation. Representative esters of such a group would include the mono-2-ethylhexyl, mono-1-methyl-4-ethylhexyl ester; the mono-2-ethylhexyl, mono-1-methylheptyl ester; etc. The compositions may also contain other ingredients, if desired or required, such, for example, as sodium phosphate, soap, other detergents, inorganic fillers and the like.

The dry, powdered sulfosuccinate should be present in amounts of from about 0.1% up to about 2%, based on the weight of the pelleted dialkyl sulfosuccinate; but larger quantities may be employed. It has been found that up to 1% may be used without any detectable effect on the surface activity of the pellets. Larger amounts produce effects which are normally not undesirable and may be used where the circumstances of the particular situation warrant such a use.

The compositions of my invention are preferably prepared by tumbling the solid, pelleted dialkyl sulfosuccinate with the dry, powdered dialkyl sulfosuccinate until the solid pellets have been coated with a fine, thin layer. The tumbling may take place in any suitable container or mixing device capable of performing the necessary intermixing. Others means may be employed for the coating process and the only requirement is that the coating be relatively thin and substantially uniform and sufficient to prevent the sticking-together of the solid particles.

The invention will be further illustrated in greater detail by the following specific example. It should be understood, however, that although this example may describe in particular detail some of the specific features of the invention, it is given primarily for purposes of illustration and the invention in its broader aspects is not to be construed as limited thereto.

*Example*

Pellets of "Aerosol OT–100%" (di-(2-ethylhexyl) sodium sulfosuccinate; M. W. 444) were placed in a standard glass container and compared with other pellets of "Aerosol OT–100%" which had been coated by tumbling with 1% of "Aerosol IB" (di-(isobutyl) sodium sulfosuccinate; M. W. 332) prior to being placed in similar standard glass container. After several weeks at room temperature, the uncoated pellets had flowed together to some extent and had formed a solid lump which was difficult to remove from the container. The coated pellets, however, were still in discrete form and were free-flowing.

Other dialkyl sulfosuccinates prepared in dry powdered form, such as the diisopropyl, diethyl and dimethyl esters, have been found to be of similar applicability as the diisobutyl ester.

Other dialkyl sulfosuccinates, as referred to hereinabove, prepared in pelleted form and especially those having alkyl radicals of a highly branched nature, such as di-(tridecyl) sodium sulfosuccinate, have been similarly improved and rendered free-flowing in nature.

Although I have described but one specific example of my invention, I consider the case not to be limited thereby nor to the specific substances mentioned therein, but to include various other equivalent compounds of similar constitution as set forth in the claims appended hereto. It is understood that any suitable changes or variations

I claim:

1. A dialkyl sulfosuccinate surface active agent in free-flowing, discrete-particle form comprising a major portion of a dialkyl sulfosuccinate in which the alkyl groups contain at least five carbon atoms and from about 0.1% to about 2.0% by weight of a powdered dialkyl sulfosuccinate in which the alkyl groups contain less than five carbon atoms, said powdered dialkyl sulfosuccinate being present as a thin layer coating said dialkyl sulfosuccinate.

2. A dialkyl sulfosuccinate surface active agent in free-flowing, discrete-particle form comprising a major portion of di-(2-ethylhexyl) sodium sulfosuccinate and from about 0.1% to about 2.0% by weight of a powdered di-(isobutyl) sodium sulfosuccinate, said powdered sulfosuccinate being present as a thin layer coating said di-(2-ethylhexyl) sodium sulfosuccinate.

3. In a method of preparing a dialkyl sulfosuccinate surface-active agent in free-flowing, discrete-particle form, the step which comprises coating a dialkyl sulfosuccinate in which the alkyl groups contain at least five carbon atoms with a thin layer of a powdered dialkyl sulfosuccinate in which the alkyl groups contain less than five carbon atoms whereby the particles which are normally tacky and tend to flow together are rendered free-flowing.

No references cited.